United States Patent [19]

Suzuki et al.

[11] Patent Number: 4,918,519
[45] Date of Patent: Apr. 17, 1990

[54] COLOR IMAGE SENSING APPARATUS HAVING COLOR BALANCE ADJUSTMENT

[75] Inventors: Masao Suzuki; Tadashi Okino, both of Kanagawa, Japan

[73] Assignee: Canon Kabushiki Kaisha, Tokyo, Japan

[21] Appl. No.: 180,341

[22] Filed: Apr. 11, 1988

[30] Foreign Application Priority Data

Apr. 23, 1987 [JP] Japan ................ 62-101021
Apr. 24, 1987 [JP] Japan ................ 62-099931

[51] Int. Cl.⁴ .............................................. H04N 9/73
[52] U.S. Cl. .................................... 358/29; 358/41; 358/909
[58] Field of Search ............... 358/29, 29 C, 41, 909

[56] References Cited

U.S. PATENT DOCUMENTS

| | | | |
|---|---|---|---|
| 4,499,487 | 2/1985 | Takayama et al. | 358/41 |
| 4,567,509 | 1/1986 | Takayama et al. | 358/29 C |
| 4,584,598 | 4/1986 | Kutaragi | 358/29 C |
| 4,595,946 | 6/1986 | Uehara et al. | 358/29 C |
| 4,616,253 | 10/1986 | Hashimoto et al. | 358/29 C |
| 4,677,489 | 6/1987 | Nishimura et al. | 358/909 X |
| 4,727,413 | 2/1988 | Miura et al. | 358/29 C |
| 4,739,392 | 4/1988 | Ueda et al. | 358/29 C |
| 4,774,564 | 9/1988 | Konishi | 358/909 X |

FOREIGN PATENT DOCUMENTS 60-240291 11/1985 Japan ................ 358/29 C

*Primary Examiner*—James J. Groody
*Assistant Examiner*—Mark R. Powell
*Attorney, Agent, or Firm*—Robin, Blecker, Daley & Driscoll

[57] ABSTRACT

A color sensing apparatus includes an image sensor which is arranged to produce a plurality of chrominance signals by converting light from an object into an electrical signal; a light source color detecting circuit which is arranged to detect a color of light from a light source; a flash device; a flash light quantity detecting circuit having a flash light detecting part which is arranged to detect the quantity of flash light of the flash device; and a control circuit which is arranged to control the color balance of the chrominance signals on the basis of a detection output of the flash light quantity detecting circuit and that of the light source color detecting circuit.

17 Claims, 12 Drawing Sheets

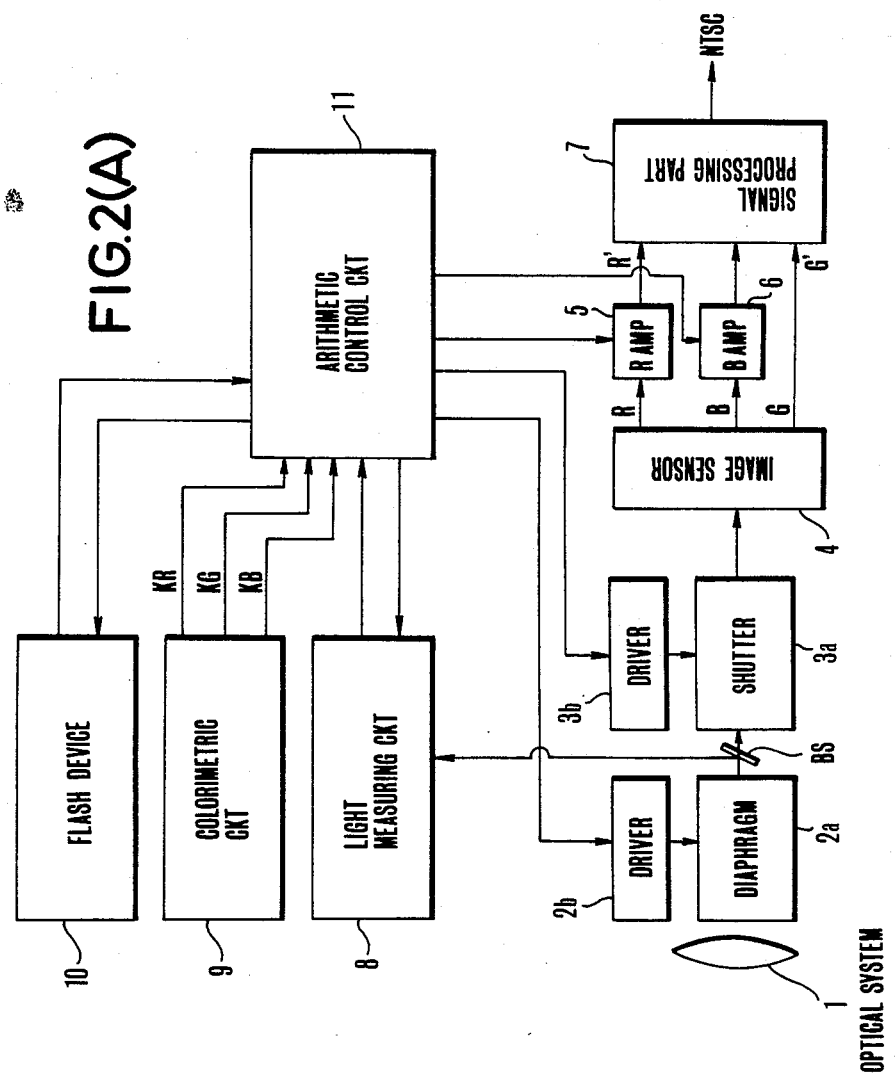

COLOR IMAGE SENSING APPARATUS HAVING COLOR BALANCE ADJUSTMENT

BACKGROUND OF THE INVENTION:

1. Field of the Invention:

This invention relates to a color image sensing apparatus having a flash device.

2. Description of the Related Art:

FIG. 1(A) of the accompanying drawings shows by way of example the conventional arrangement for white balance adjustment. Referring to FIG. 1(A), a colorimetric circuit 9 is arranged to separate the light of a light source into color components (or three primary colors of red, blue and green in this instance) and to convert these color components into electrical signals. A control part 12 is arranged to produce a white balance control signal on the basis of signals obtained from the colorimetric circuit 9. An image sensor 4 is arranged to separate the image of an object into, for example, the three primary colors an to convert them into electrical signals. A B amplifier 6 is arranged to amplify the blue component of the object's image obtained from the image sensor 4. An R amplifier 5 is arranged to likewise amplify the red component of the object's image.

A signal processing part 7 is arranged to produce a given standard TV signal on the basis of the red and blue signals amplified by the R and B amplifiers 5 and 6 and also a green signal obtained from the image sensor 4. A reference numeral 10 denotes a flash device.

The conventional apparatus of FIG. 1(A) operates in a manner as described below with reference to FIG. 1(A):

The red, blue and green components of the light of a light source are converted by the colorimetric circuit 9 into signals KR, KG and KB. The control part 12 then obtains a ratio KR/KG between the red and green components and a ratio KB/KG between the blue and green components of the light of the light source from signals KR, KG and KB. Meanwhile, the object's image is likewise converted by the image sensor 4 into signals representing the three different color components thereof including red (R), green (G) and blue (B) components.

The term "white balance adjustment" means as well known to remove the influence of the light of a light source from light reflected by an object in such a way as to ensure that a white object can be reproduced in a white color. The white balance adjustment can be accomplished by multiplying the above stated R signal by the ratio KG/KR and the B signal by the ratio KG/KB. Therefore, the control part 12 is arranged to produce control signals to the B amplifier 6 and the R amplifier 5 for this purpose. The details of the operation of the control part 12 are as follows: Referring to FIG. 1(B), the outputs KR, KG and KB of the colorimetric circuit 9 are respectively supplied to logarithmic compression circuits 12-1, 12-2 and 12-3 which are included in the control part 12 for the purpose of effective use of the dynamic range and for facilitating the ensuing processes of the circuit. The logarithmic compression circuits 12-1, 12-2 and 12-3 produces signals logKR, logKG and logKB. The signals logKR and logKG are supplied to a differential device 12-4 while the signals logKB and logKG are supplied to a differential device 12-5. As a result, differential outputs log(KG/KR) and log(KG/KB) are obtained from these differential devices.

Normally, the above stated differential outputs are supplied via switches 12-8 and 12-9 to the R amplifier 5 and the B amplifier 6 for white balance adjustment.

In the event of shooting with flash light, a charge completion signal produced from the flash device 10 comes to shift the connecting positions of switches 12-8 and 12-9 to their contacts disposed on the side of constants 12-6 and 12-7 provided for the flash device. Then, constants logSR and logSB for flashing are supplied to the R amplifier 5 and the B amplifier 6 respectively. This arrangement ensures correct white balance adjustment even in the case of flash photography. Examples of the above described arrangement of the prior art are disclosed in U.S. Pat. No. 4,567,509 and U.S. Pat. No. 4,499,487 assigned to the assignee of the present invention.

The arrangement described presents no problem if the object is illuminated solely by flash light during the shooting process with flashing. However, in the event of an object environed by a bright light which gives a mixed illumination light consisting of the flash light and the ambient light, the white balance would be lost if the adjustment is made on the basis of a given constant provided for white balance adjustment. This problem becomes conspicuous especially in cases where the amount of flash light is small like in daylight synchronization, or fill-in flash, or where the ambient light greatly differs from the flash light like in the case of the light of a fluorescent lamp.

Further, another problem with the conventional white balance adjustment device resides in that: The light of a fluorescent lamp has a great intensity of the green component and thus greatly differs in nature from various light sources which are black-body radiators. Further, a fluorescent lamp is seldom arranged to convergently illuminate an object. Besides, it has a relatively high degree of illuminance and tends to strongly affect the flash light illumination. To solve this problem, it has been practiced to change a white balance adjustment value over to a constant value upon detection of the light of a fluorescent lamp as disclosed in U.S. Pat. No. 4,595,946. Under such a condition, therefore, it has been hardly possible to make accurate white balance adjustment.

SUMMARY OF THE INVENTION:

It is an object of this invention to provide a color image sensing apparatus which is capable of solving the above stated problems of the prior art and is arranged to give an apposite white balance even in the event of a flash light commixing with an ambient light.

To attain this object, an embodiment of this invention is arranged to detect the amount of flash light emitted from a flash device with a controlled amount of flash light also taken into consideration; to compute a ratio obtained in an image sensing signal between the detected flash light and ambient light; and to compute and obtain a control voltage from a white balance constant provided for flashing and the output of a colorimeteric circuit on the basis of the result of ratio computation. The embodiment arranged in this manner is capable of always accurately carrying out white balance adjustment even in cases where a flash light is commixing with an ambient light.

It is another object of this invention to provide an image sensing apparatus which is capable of performing a flash-light image sensing (or photo taking) operation without any white balance deviation against any illumination light sources including a fluorescent lamp in the case of photo taking with flash light.

To attain that object, an image sensing apparatus arranged as an embodiment of the invention is provided with a first illumination light source which is arranged to cooperate with the image sensing apparatus; detecting means arranged to detect the presence of a second illuminating light source which differs from the first illumination light source; and correcting means for correcting, in accordance with the output of the detecting means, a first color balance state corresponding to the first illumination light source. The image sensing apparatus arranged in this manner according to this invention is capable of performing an image sensing operation without any white balance deviation against the second illumination light source including a fluorescent lamp, etc. in the event of the use of the first illuminating light source including a flash device.

The above and other objects and features of the invention will become apparent from the following detailed description of embodiments thereof taken in connection with the accompanying drawings.

BRIEF DESCRIPTION OF THE DRAWINGS:

FIG. 2(A) is a block diagram showing a first embodiment of this invention.

Figure 2B:
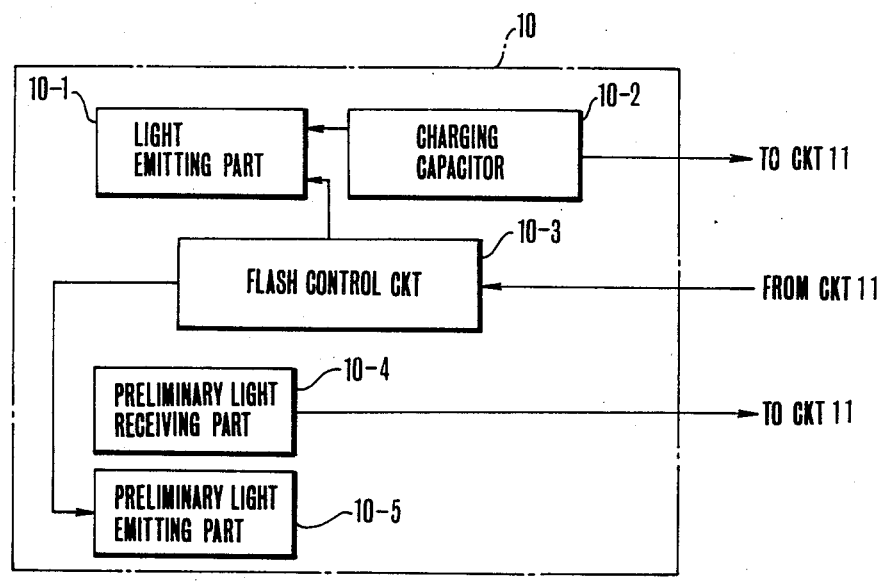
FIGS. 2(B) and 2(C) are block diagrams showing the details of parts of FIG. 2(A).
Figure 2C:
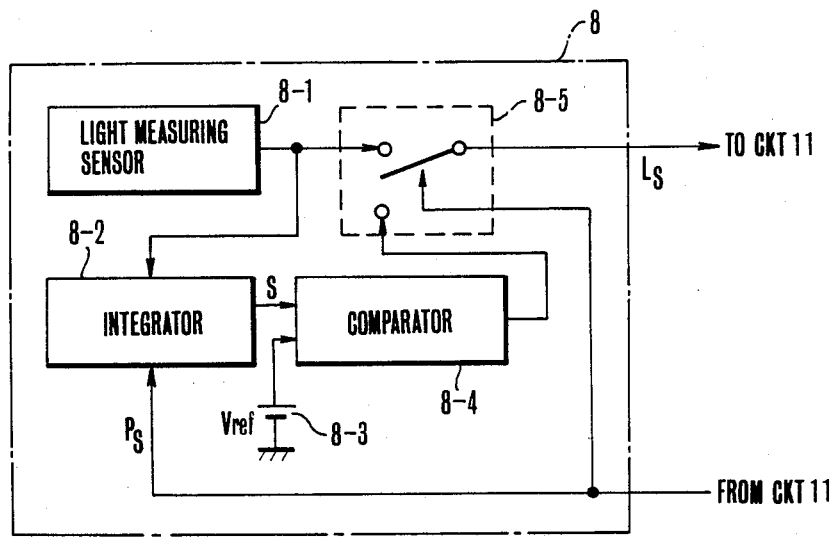
Figure 3:
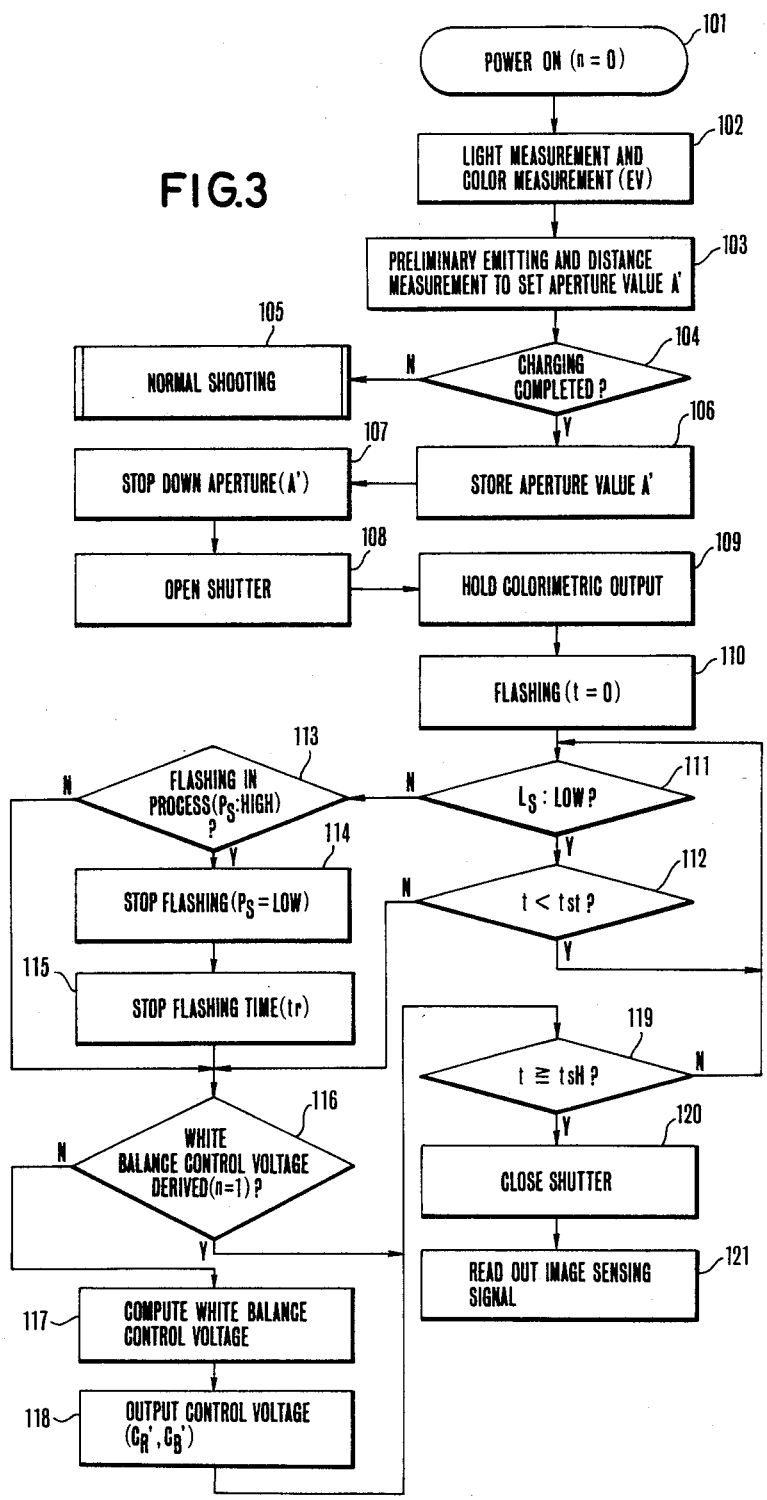
FIGS. 3 and 4 are flow charts showing the operation of the first embodiment.
Figure 4:
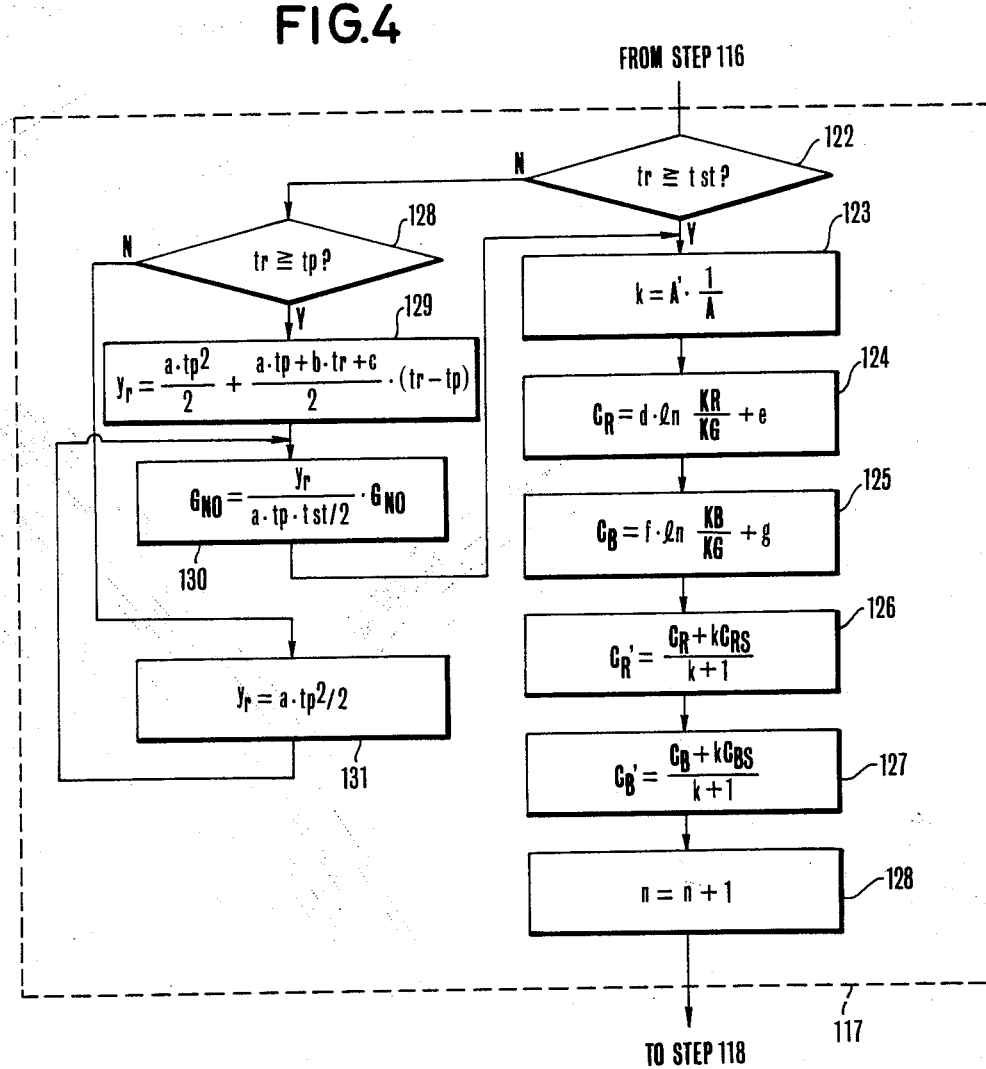
Figure 6:
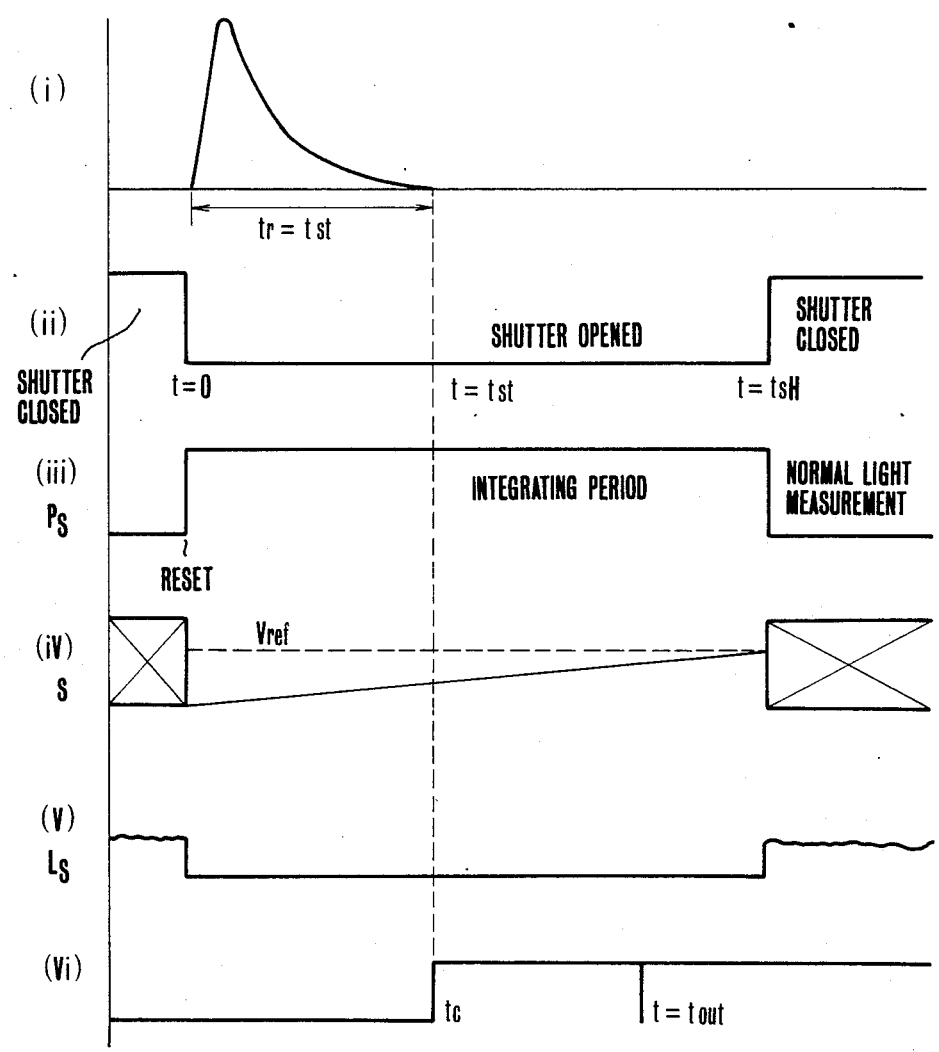
FIGS. 6 and 7 are timing charts showing the operation of the first embodiment.
Figure 7:
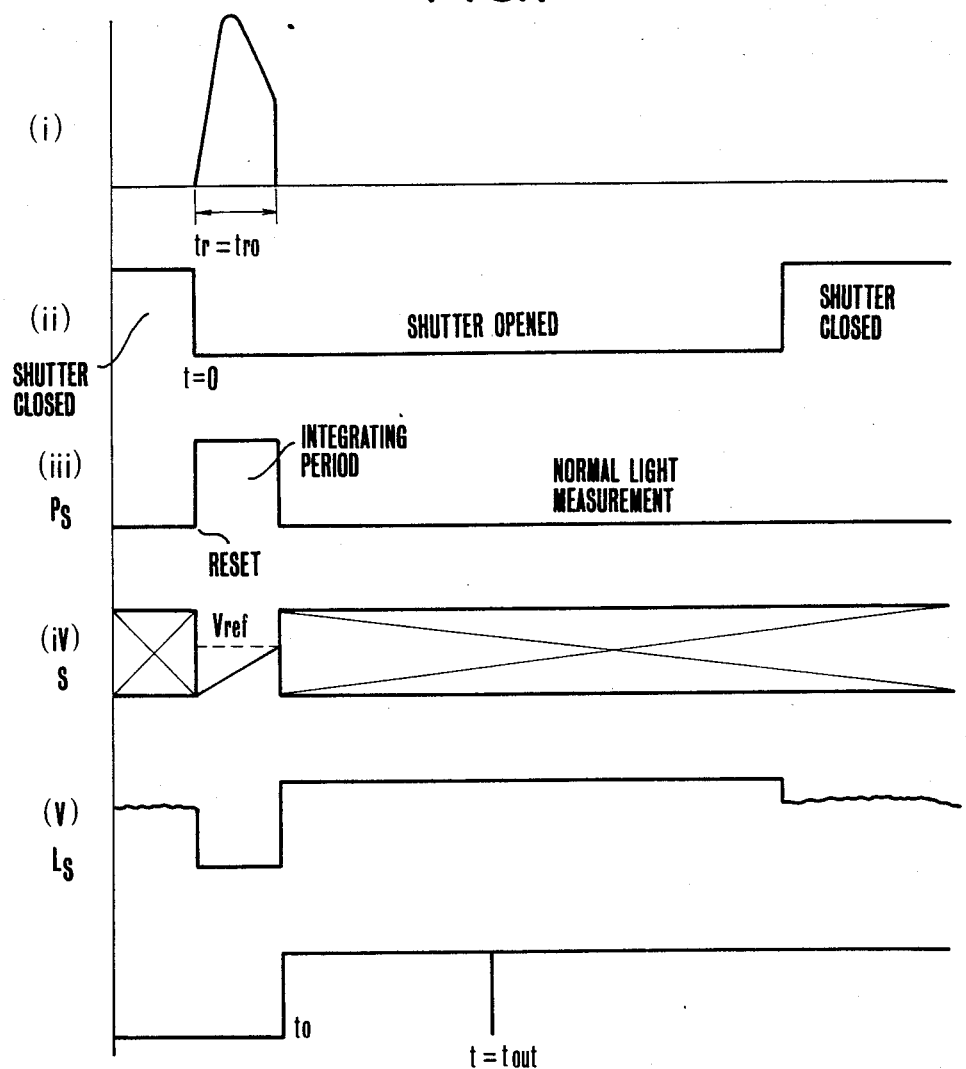
Figure 8:
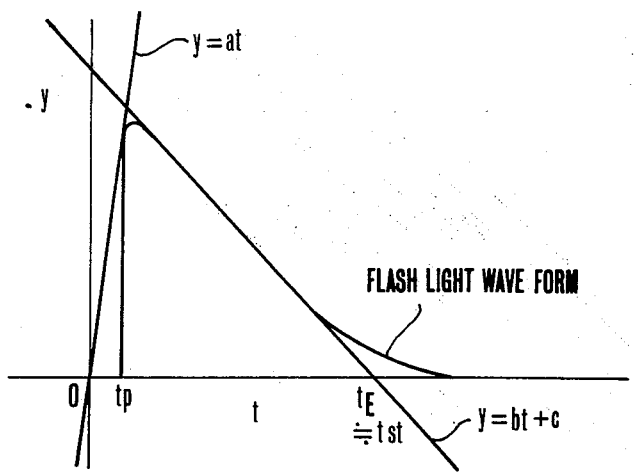
FIG. 8 is a wave form chart showing the wave form of flash light.

DETAILED DESCRIPTION OF THE PREFERRED EMBODIMENTS:

FIGS. 2(A) to 4, 6, 7 and 8 show the first embodiment of this invention. Of these drawings, FIG. 2(A) shows in a block diagram the whole arrangement of the first embodiment. FIGS. 2(B) and 2(C) partly show the details of the first embodiment. FIGS. 6 and 7 show the operation of the same embodiment in timing charts. FIG. 8 shows the wave form of flash light obtained by the embodiment. FIGS. 3 and 4 show the operation of the same embodiment in flow charts.

Figure 1A:
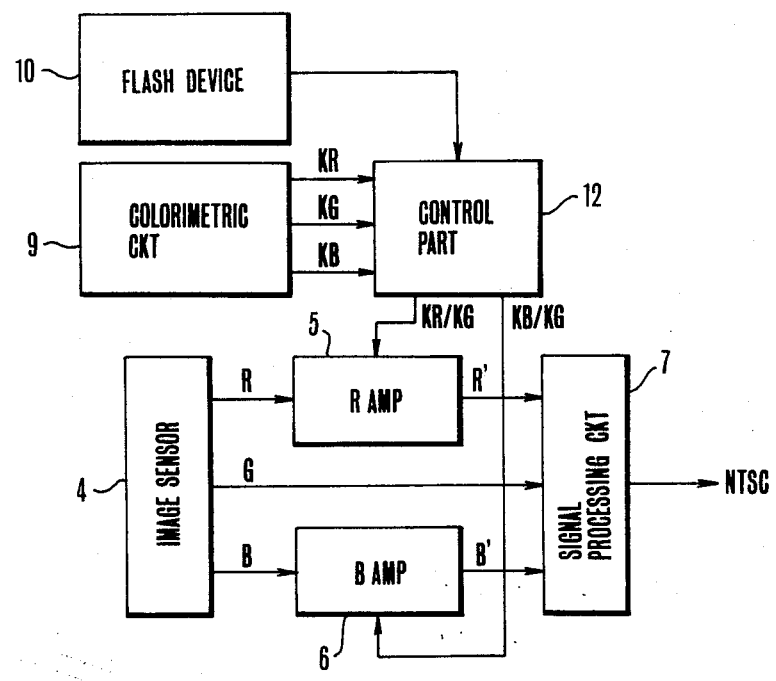
FIGS. 1(A) and 1(B) are block diagrams showing by way of example the arrangement of the conventional image sensing apparatus.
Figure 1B:
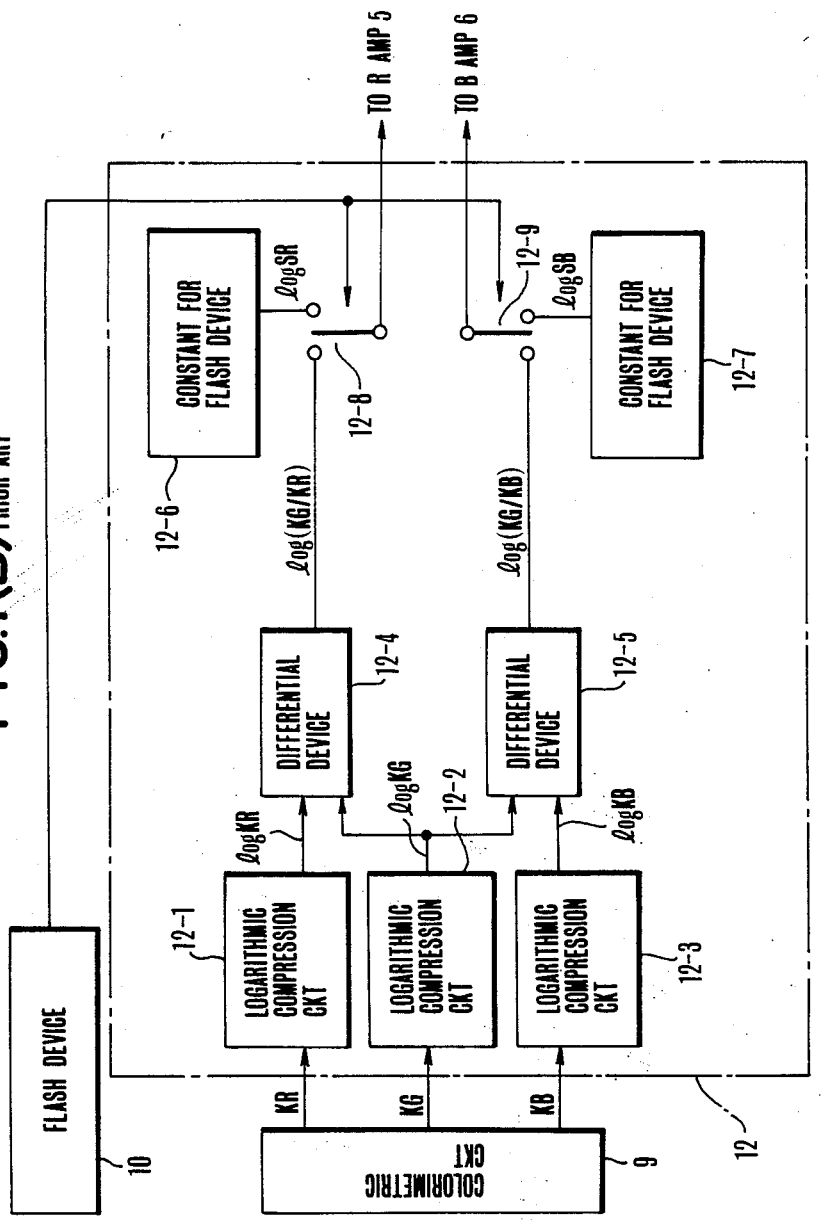

Referring to FIG. 2(A), an optical system 1 is arranged to bring the image of an object into focus. A diaphragm 2a is arranged to restrict a light flux coming from the object. A driver 2b is arranged to drive the diaphragm 2a. A shutter 3a is arranged to define the incident time of the light flux coming from the object. A driver 3b is arranged to drive the shutter 3a. Other elements 4 to 7, 9 and 10 are arranged to function in the same manner as the elements of the conventional system indicated by the same reference numerals in FIG. 1(A). A light measuring circuit 8 is arranged to measure through a beam splitter BS the quantity of light coming through the diaphragm 2a. An arithmetic control circuit 11 is arranged to control the drivers 2b and 3b, an R amplifier 5 and a B amplifier 6 according to information obtained from the light measuring circuit 8, a colorimetric circuit 9 and a flash device 10.

The details of the flash device 10 are as shown in FIG. 2(B). The flash device 10 comprises a light emitting part 10-1 which is arranged to emit a flash light; a charging capacitor 10-2 which is arranged to accumulate a necessary amount of electric charge for flashing by the light emitting part 10-1; a flash control circuit 10-3 which is arranged to cause the light emitting part 10-1 or a preliminary light emitting part 10-5 to emit light on the basis of a control signal received from the arithmetic control circuit 11; a preliminary light receiving part 10-4 which receives the light emitted from the preliminary light emitting part 10-5; and the preliminary light emitting part 10-5 which is arranged to emit a preliminary flash light prior to flashing by the light emitting part 10-1.

The details of the light measuring circuit 8 are as shown in a block diagram in FIG. 2(C). The light measuring circuit 8 comprises a light measuring sensor 8-1 which is arranged to perform photo-electric conversion; an integrator 8-2 which is arranged to integrate the output of the light measuring sensor 8-1; a constant voltage source 8-3 which is arranged to produce a voltage of a constant value; a comparator 8-4 which is arranged to compare the output of the integrator 8-2 and that of the constant voltage source 8-3; a switch circuit 8-5 which is arranged to perform a switching action on the output of the light measuring sensor 8-1 and that of the comparator 8-4.

Referring to FIGS. 2(A) to 4, 6, 7 and 8, the first embodiment of the invention operates as follows:

As shown in FIG. 3, when a power supply is switched on, a counted value n stored within a memory included in the arithmetic control circuit 11 is set at zero (n=0) at a step 101. At a step 102: The light measuring circuit 8 and the colorimetric circuit 9 are actuated. Then, the connecting position of the switch 8-5 is shifted on the side of the light measuring sensor 8-1. As a result, an exposure value EV is obtained. Step 103: The preliminary light emitting part 10-5 emits light. The light is received by the preliminary light receiving part 10-4. A distance to the object is measured from a time difference between the light emission and the receipt of the light. An aperture value A' is obtained through a computing operation on the measured distance and the guide number of the light emitting part 10-1. Step 104: A check is made for a signal produced from the charging capacitor 10-2 indicating completion of a charging process at the capacitor. If the charging process has not been completed as yet, the flow of operation comes to a step 105 to allow normal shooting without flash light illumination. If the capacitor is found to have been completely charged, the flow comes to a step 106. Step 106: The data of the guide number GNo from the flash device 10, the aperture value A' and a distance value D are supplied to and stored at the arithmetic control circuit 11. Step 107: The driver 2b is caused to stop down the aperture of the diaphragm 2a to a position corresponding to the aperture value A'. Step 108: The shutter 3a, is opened for a preset period of time tsH. Step 109: At the same time, the colorimetric output of the colorimeteric circuit 9 is held. Step 110: After that, the flash device 10 is allowed to flash. A flash start time t is set at "0". At the same time, the connecting position of the switch 8-5 is shifted to the output terminal of the comparator 8-4. Step 111: The output of the light measuring circuit 8 (the output of the comparator 8-4) is checked for a low level. The details of an operation of the light measuring circuit 8 are as follows: The output of the light measuring sensor 8-1 is supplied to and integrated by the integrator 8-2. The integration output of the integrator 8-2 is supplied to the comparator 8-4 to be compared with a constant voltage Vref of the constant voltage source 8-3 which represents an apposite light measurement level. In this instance, the integrator 8-2 is reset at the commencement of flashing and performs an integrating action from a state of t=0 to a state of t=tsH. The output level of the comparator 8-4 becomes high when the integrated value S of the integrator 8-2 comes to exceed the constant voltage Vref. If not, the output of the comparator 8-4 is at a low level. Meanwhile, as mentioned above, the position of the switch 8-5 is on the side of the comparator 8-4 during the period of integration and, except this, always remains on the side of the light measuring sensor 8-1. FIGS. 6 and 7 show the above stated operation of the light measuring circuit 8 in time charts.

Referring to FIG. 6, a part (i) shows the flash light wave form of the flash device 10. The flashing start time is assumed to be t=0. The flashing time tr is assumed to be a period tst when the flash light is fully emitted. A part (ii) shows the controlled state of the shutter 3a. The shutter 3a opens at the time point t=0 and closes at another time point t=tsH. A part (iii) shows a signal Ps sent from the arithmetic control circuit 11 to the integrator 8-2. The signal Ps resets the integrator 8-2 at the time point t=0 and remains at a high level to keep it in an integrating state so long as a signal Ls which will be described later is at a low level. A part (iv) shows the output S of the integrator 8-2. The integrator 8-2 is reset at the time point t=0 and integrates the output of the light measuring sensor 8-1 while the signal Ps is at a high level.

A part (v) of FIG. 6 shows the output Ls of the switch 8-5, which is produced from the comparator 8-4 during the period of integration and is at a low level if the signal S is lower than the constant voltage Vref and is at a high level if the signal S is at a high level. With the exception of the integration period, the output of the comparator 8-4 is produced always from the light measuring sensor 8-1.

If the signal Ls is found to be at a low level at the step 111, it indicates that the integration output is smaller than the constant voltage Vref. In that event, therefore, there is no fear of overexposure to the light. Step 112: A check is made for a state of t<tst, which indicates that the flashing is still in process. If this state is confirmed, the level of the signal Ls is again checked to see if it is at a low level. Step 116: If the signal Ls is found to be at a low level an there obtains a state of t≧tst, a check is made for a white balance control voltage to see if it has been derived by computation. More specifically, a check is made for n=1 because the counted number n is set at n=1 upon completion of derivation of the white balance control voltage. The white balance control voltage is considered to have been derived in the case of n=1 and not to have been derived in the event of n=0. If the white balance control voltage is found to have been derived, the flow comes to a step 119 for confirmation of t≧tsH. If not, the flow comes to a step 117. Step 117: The white balance control voltage is computed. Step 118: the white balance control voltage is produced. Step 119: A check is made for t≧tsH. If the state of t≧tsH is confirmed, the flow comes to a step 120 to close the shutter 3a; and then an image sensing signal is read out at a step 121. If not, or in the event of t<tsH, the flow comes back to the step 111.

In the case that the signal Ls is at a high level, it indicates that the integration output S has come to exceed the constant voltage Vref. In that case, therefore, a flashing action must be immediately brought to a stop, if it is in process. Therefore, the flow comes to a step 113 to make a check to see if the flashing action is in process. For this purpose, the signal Ps is checked for its level. If it is found to be at a high level, it indicates flashing is in process. If so, therefore, the flow comes to a step 114 to bring the flashing action to a stop. At the same time, the level of the signal Ps is changed to a low level. The flow then comes to a step 115 to store the flashing time tr. After that, the flow proceeds to the step 116 and the ensuing steps. Further, in case that the signal Ps is found to be at a low level at the step 113 thus indicating no flashing, the flow comes to the step 116. The processes of operation at the step 116 and the ensuing steps have already been described in the foregoing. Now, on the basis of the above stated flow of operation, two different operations will be described below with reference to FIGS. 6 and 7:

Referring first to FIG. 6, since the integration output S is not exceeding the level of the constant voltage Vref, the signal Ls remains at a low level to the last. At the point of time t=tsH, the white balance control voltage is computed and produced at the steps 117 and 118. The R amplifier 5 and the B amplifier 6 are controlled by the control voltage and the white balance is adjusted accordingly. In the case of FIG. 7, the integration output S comes to exceed the level of the constant voltage Vref at the point of time t=tr0. Therefore, the level of the signal Ls becomes high at that point of time. Then, flashing is brought to a stop at the steps 113 and 114 and the stopped time tr is stored. After that, the white balance control voltage is computed and produced at the time point t=tr0 through the steps 117 and 118 for white balance adjustment.

Next, referring to FIG. 4, further details of the white balance control voltage computing operation at the step 117 are as follows: At a step 122: A check is made for tr≧tst. If this state is confirmed, the flow of operation comes to a step 123 to obtain k by the following formula:

$$k = \frac{GNo}{D} \cdot \frac{1}{A} = \frac{A'}{A}$$

(wherein D represents an object distance; GNo the guide number of the light source.) In the formula shown above, a value A is obtained from the following formula:

$$2^{EV} = \frac{A^2}{T}$$

(wherein EV represents an exposure value obtained by light measurement and 1/T a shutter synchronizing speed.)

The value k which is thus obtained represents a ratio between the quantity of flash light and that of ambient light.

In case that the flash device is not allowed to flash, white balance control voltages CR and CB are obtained by the following formulas at steps 124 and 125:

$$CR = d \cdot \ln \frac{KR}{KG} + e$$

$$CB = f \cdot \ln \frac{KB}{KG} + g$$

(wherein d, e, f and g represent constants respectively.)

Steps 126 and 127: White balance control voltages CR' and CB' for mixed light are obtained by the following formulas using the above value k and flash light source compensating control voltages CRS and CBS (each a constant value).

$$CR' = \frac{CR + kCRS}{k+1}, \quad CB' = \frac{CB + kCBS}{k+1}$$

one (n=n+1) to change it from n=0 to n=1 and the computing operation of the step 117 comes to an end.

Meanwhile, in the event of tr<tst, since the flashing comes to a stop halfway in this instance, the quantity of the flash light to be emitted becomes smaller than in the case of tr≧tst (full flashing). In this instance, therefore, the white balance control voltage must be obtained by taking into consideration the decreased quantity of the flash light.

Therefore, the flash light wave form is first approximated to a part encompassed with straight lines y=a·t, y=b·t+c and y=0. Then, the flash light emitting quantity is derived from an area ratio.

In the case of tr<tp, an area yr corresponding to the light emitting quantity is obtained as follows:

$$yr = \frac{a \cdot tp^2}{2} \quad \text{(Step 131)}$$

In the case of tr≧tp, the area yr is obtained in the following manner:

$$yr = \frac{a \cdot tp^2}{2} + \frac{a \cdot tp + b \cdot tr + c}{2} \cdot (tr - tp) \quad \text{(Step 129)}$$

Further, in the case of full flashing, the area yr' corresponding to the flash light emitting quantity can be expressed as follows:

$$yr' = a \cdot tp \cdot tst / 2.$$

Therefore, in case where the flash device is to be used not in the full flashing mode, the guide number GNo is changed (Step 130) as follows:

$$GNo = \Xi yr / (a \cdot tp \cdot tst / 2) \cdot GNo$$

With the guide number GNo obtained in the above stated manner, the control voltage is obtained by carrying out computing operations on the basis of the guide number GNo thus obtained according to formulas shown at the step 123 and ensuing steps.

Figure 5:
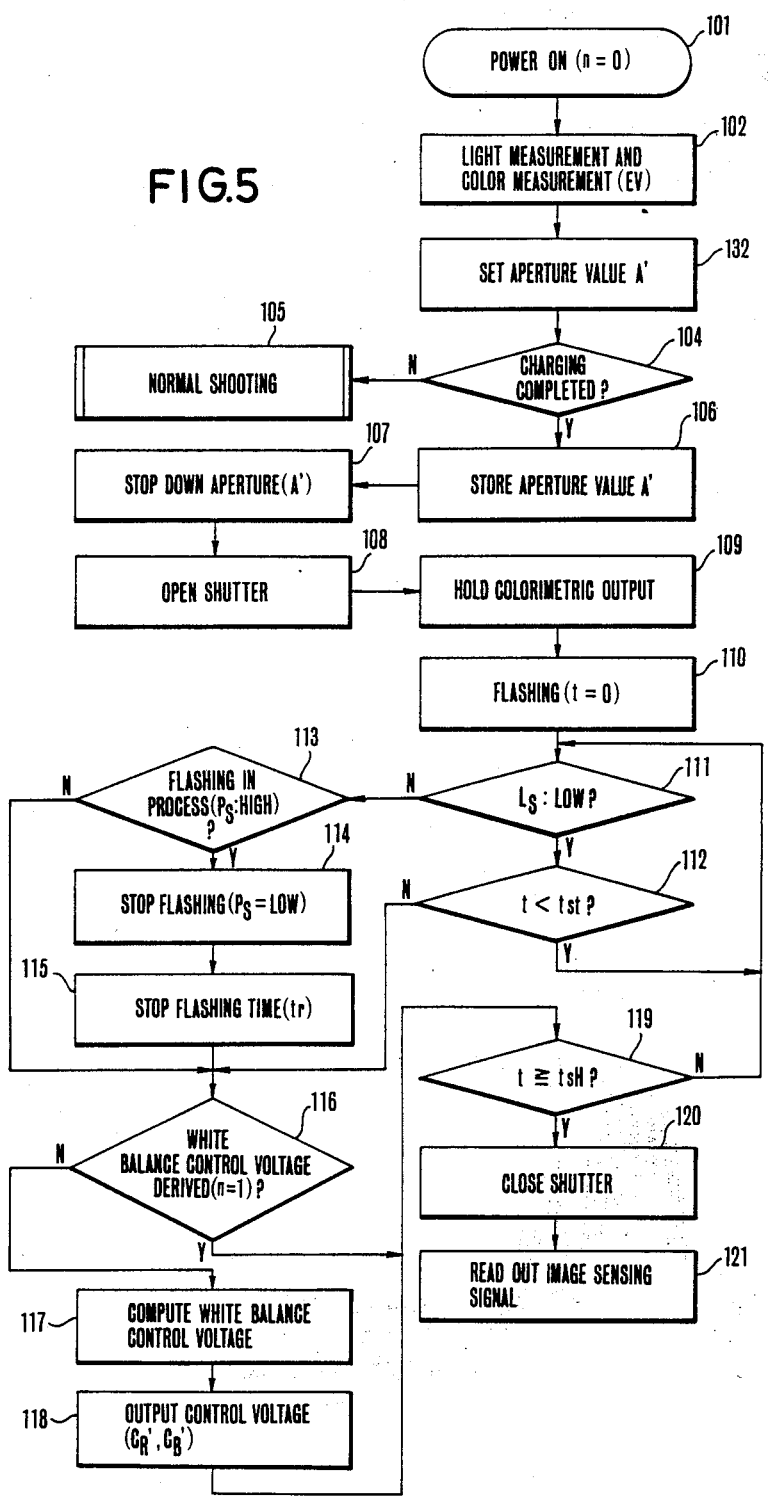
FIG. 5 is a flow chart showing the operation of a second embodiment of the invention.

FIG. 5 shows in a flow chart the operation of a second embodiment of the invention. In the case of the first embodiment, the image sensing system is arranged to automatically set the diaphragm aperture in the mode called an automatic flash mode on the basis of distance data obtained by operating the flash device 10. The second embodiment is arranged to be capable of performing white balance adjustment in the same manner also in a mode of permitting the operator to manually select an F number. In this instance, the preliminary flashing and distance measuring actions which are performed at the step 103 are not necessary. The diaphragm aperture is stopped down in accordance with an aperture value A' which is set at the flash device 10 in a step 132. This aperture value A' is then used for computation.

Further, while the first embodiment is arranged to detect and obtain the three color components R, G and B as the outputs of the colorimeteric circuit 9, the second embodiment may be arranged to make white balance adjustment by predicting the component G with only two color components R and B detected.

Further, while three primary colors R, G and B are employed as the outputs of the image sensor 4 and the colorimetric circuit 9, these primary colors may be replaced with some suitable complementary colors.

According to the arrangement of the invention as mentioned in the foregoing, in carrying out an image sensing operation with the aid of a flash light source, the flash light quantity is detected and the white balance adjustment is accomplished in accordance with the ratio of the detected quantity of flash light quantity to the quantity of ambient light. The embodiment of the invention is capable of making apposite white balance adjustment even in the event of a small flash light quantity or in cases where an ambient light source is a fluorescent lamp.

Figure 9:
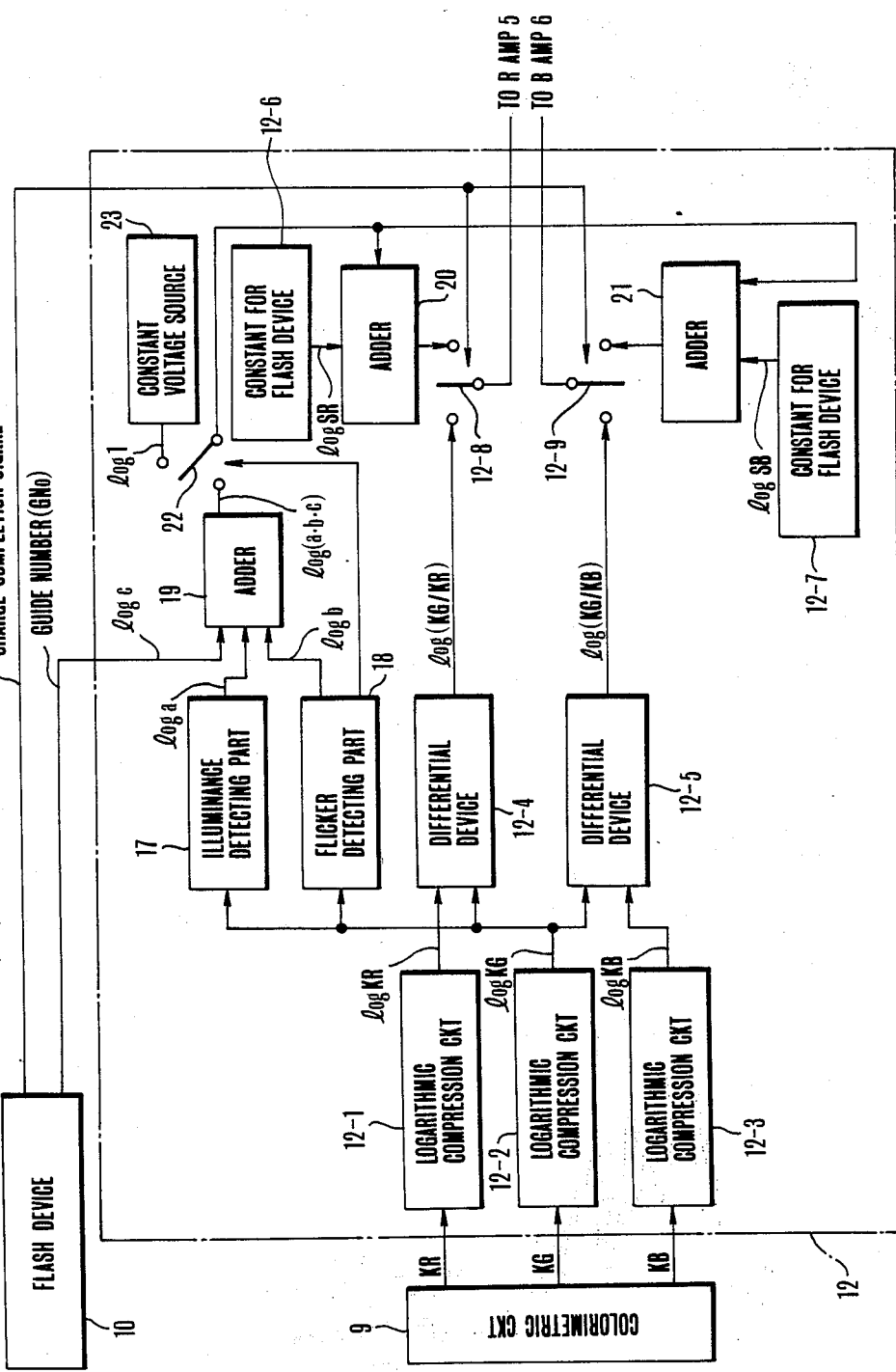
FIG. 9 is a block diagram showing a third embodiment of the invention.

FIG. 9 is a block diagram showing in outline a control arrangement for white balance adjustment arranged included in a third embodiment of this invention. The third embodiment includes the same elements 1 to 16 as those shown in FIGS. 7(A) to 8. Referring to FIG. 9, an illuminance detecting part 17 is arranged to detect the brightness of ambient light by receiving the output of a logarithmic compression circuit 12-2. A flicker detecting part 18 is arranged to find whether the ambient light is the light of a fluorescent lamp or not by receiving also the output of the logarithmic compression circuit 12-2. An adder 19 is arranged to add together the output of the illuminance detecting part 17 and that of the flicker detecting part 18. Adders 20 and 21 are arranged to add to the output of the adder 19 constants 12-6 and 12-7 provided for the flash device. A switch 22 is arranged to connect or disconnect the adders 19 to or from the adders 20 and 21. A constant voltage source 21 is arranged to supply "log 1" to the adders 20 and 21 when no flicker is detected. The third embodiment operates as follows:

Referring to FIG. 9, the converted signals KR, KG and KB obtained by the colorimetric circuit 9 which is arranged to serve as light source color detecting means are supplied to logarithmic compression circuits 12-1, 12-2 and 12-3 respectively to obtain signals logKR, logKG and logKB. The signals logKR and logKG are supplied to a differential device 12-4 and the signals logKB and logKG to another differential device 12-5. As a result, signals log(KG/KR) and log(KG/KB) are produced from the differential devices 12-4 and 12-5. In the normal shooting mode, these outputs are supplied via switches 12-8 and 12-9 to the R amplifier 5 and the B amplifier 6 for white balance adjustment.

Meanwhile, the logarithmic compression output of the logarithmic compression circuit 12-2 is supplied to the illuminance detecting part 17 to be converted into "log a" which is a logarithm of a value "a" proportional to that of the signal KG. A green filter which is used at the colorimetric circuit 9 for obtaining the signal KG has a spectral sensitivity characteristic closely resembling the visibility of human. Therefore, the value of the signal KG can be regarded as approximately corresponding to the overall illuminance of all the light sources.

The signal logKG is supplied also to the flicker detecting part 18. The flicker detecting part 18 then produces the logarithmic value "log b" for a value "b" which is proportional to the flickering amplitude of the fluorescent lamp light coming as ambient light. The flicker detecting part 18 consists of a band-pass filter and an integrating circuit which is arranged to integrate the output of the band-pass filter. Under illumination by a fluorescent lamp, this value "b" is larger than 1 and varies with the intensity of the fluorescent lamp light. In the event of illumination by a mixture of sunlight and fluorescent lamp light, the value "b" is small and is close to 1. Under sunlight or the like that has no flicker, the value "b" becomes equal to 1.

With respect to an image sensing (or photo taking) operation with the aid of flash light, it is the presence of fluorescent lamp light that presents a problem. The problem becomes serious particularly when the light in question is bright. The white balance deviation takes place when a high luminous intensity of fluorescent lamp light mixes in the flash light. In such a case, therefore, compensation must be made taking into consideration a ratio between the brightness "a" of the ambient light and the brightness "b" of the mixture of the ambient light and the fluorescent lamp light as well as the flash light quantity (guide number) "c" of the flash device. The logarithmic values of these values "a", "b" and "c" are respectively supplied from the illuminance detecting part 17, the flicker detecting part 18 and the flash device 10 to the adder 19 to obtain a logarithmic value log(a·b·c) of the product of the values "a", "b" and "c".

In the case of illumination by the light of a light source having no flicker like the sunlight (b = 1), the connecting position of the switch 22 is shifted by the output of the flicker detecting part 18 to the constant voltage source 23. Then, a signal "log 1" (=0) is supplied to the adders 20 and 21. In this case, the outputs of the adders 20 and 21 respectively become logSR and logSB. As a result, the constants 12-6 and 12-7 for the flash device are supplied as they are to the switches 12-8 and 12-9. In other words, in the case of photo taking with flashing under light having no flicker, the signals logSR and logSB are supplied to the switches 12-8 and 12-9. When the charge completion signal of the flash device 10 is supplied to the control terminals of the switches 12-8 and 12-9, or when a flash shooting mode selection switch is closed if the apparatus is provided with such a switch, the positions of the switches 12-8 and 12-9 are shifted to allow the signals logSR and logSB to be supplied to the B amplifier 6 and the R amplifier 5 respectively. As a result, white balance adjustment is made in the same manner as in the case of the conventional apparatus to give a first color balance state which is suited for the color temperature of the flash light source.

Meanwhile, in the event of having flickering fluorescent lamp light as the ambient light, the position of the switch 22 is shifted to the adder 19 by the output of the flicker detecting part 18. This allows the output log-(a·b·c) of the adder 19 to be supplied to the adders 20 and 21 via the switch 22. Then, the outputs of the adders 20 and 21 are supplied to the switches 12-8 and 12-9 as signals log(a·b·c·SR) and log(a·b·c·SB) respectively.

In other words, in the case of flash shooting in the presence of flickering light, the above stated signals log(a·b·c·SR) and log(a·b·c·SB) are supplied to the switches 12-8 and 12-9 respectively. Then, when the above stated charge completion signal is supplied to the control terminals of the switches 12-8 and 12-9, these signals are allowed by the switches 12-8 and 12-9 to be supplied to the R and the B amplifiers 5 and 6. As a result, the influence of the fluorescent lamp light can be compensated for (the green component of the light is weakened, i.e. the red and blue components thereof are intensified) according to the amplitude of the flicker, the brightness of the ambient light and the flash light quantity of the flash device. The third embodiment is thus arranged to be capable of performing flash light photo taking with adequate white balance adjustment even under the influence of a bright fluorescent lamp light.

The third embodiment is arranged to make compensation with the flickering amplitude, the brightness of the ambient light and the quantity of the flash light used as parameters. This arrangement of the embodiment may be changed to see if the flickering amplitude and the brightness of ambient light exceed given values and, if so, to compensate for the influence of fluorescent lamp light with the values which are determined at the time of flash light photo taking. In that event, therefore, the white balance adjustment for flash light photo taking can be accomplished at an acceptable level of accuracy. The third embodiment permits reduction in the number of parts required by other embodiments described in the foregoing.

While the control part 12 of the third embodiment comprises analog hard-ware components arranged as shown in FIG. 9, use of a micro-computer in place of the control part 12 would permit a greater degree of reduction in the number of parts. Further, while the embodiment is arranged to adjust the gains of the R and B channels for color balance adjustment, the arrangement may be changed to make color balance adjustment by varying the levels of signals (R - Y) and (B - Y). The first illuminating light source which is to be used in combination with the image sensing apparatus can be any flash device. The second illuminating light source is not limited to a fluorescent lamp but may be a light source of any other kind, such as a mercury arc lamp or the like.

The image sensing apparatus which is described in the foregoing as the third embodiment of this invention is arranged to detect the level of a second illumination light which differs from a first illumination light employed in combination with the apparatus and to correct a first color balance state corresponding to the first illumination light in performing an image sensing operation with the aid of the first illumination light source. This arrangement enables the third embodiment to be capable of making apposite white balance adjustment even under the adverse influence of such a light source that greatly differs from the first illumination light in nature, like in the case of fluorescent lamp light.

What is claimed is:

1. An image sensing apparatus arranged to be used in combination with a flash device, comprising:
   (a) color image sensing means;

(b) first signal forming means for forming a first signal according to the brightness of an object, without emitting light by said flash device; and (c) control means for forming a third signal by indicating balance of a second signal corresponding to the quantity of light emitted by said flash device between said first signal, and for adjusting a color balance of an output of said color image sensing means according to said third signal.

2. An apparatus according to claim 1, wherein said first signal forming means is arranged to form said first signal mainly according to the intensity of a green component of light from said object.

3. An apparatus according to claim 1, further comprising detecting means for detecting mainly the intensity of a red component and that of a blue component of light from said object.

4. An apparatus according to claim 3, wherein said control means is arranged to make said color balance adjustment either in a first mode in which an output of said detecting means is used or in a second mode in which the output of said detecting means is not used.

5. An apparatus according to claim 4, wherein said control means is arranged to select said second mode when said flash device is operated.

6. An image sensing apparatus comprising:
(a) color image sensing means;
(b) light source color detecting means for detecting a color of a light source, without emitting light by a flash device;
(c) flash light quantity detecting means for detecting the quantity of light emitted from said flash device; and
(d) control means for controlling the white balance of an output of said color image sensing means on the basis of an output of said light source color detecting means and that of said flash light quantity detecting means.

7. An apparatus according to claim 6, wherein said light source color detecting means includes a red color sensor which is arranged to mainly detect the intensity of a red component of light from an object; and a blue color sensor which is arranged to mainly detect the intensity of a blue component of light form said object.

8. An apparatus according to claim 7, wherein said light source color detecting means further includes a green color sensor which is arranged to mainly detect the intensity of a green color component of light from said object.

9. An apparatus according to claim 6, wherein said control means includes computing means which is arranged to compute an output of said light source color detecting means and that of said flash light quantity detecting means.

10. An image sensing apparatus comprising:
(a) color image sensing means;
(b) a flash device;
(c) flash light quantity detecting means for detecting the quantity of light emitted from said flash device; and
(d) brightness detecting mean for detecting the brightness of an object, without emitting light by said flash device; and
(e) control means for controlling the white balance of an output of said color image sensing means on the basis of at least balance of an output of said brightness detecting means and that of said flash light quantity detecting means.

11. An apparatus according to claim 10, further comprising light source color detecting means for detecting a color of light from a light source.

12. An apparatus according to claim 11, wherein said control means is arranged to control said white balance by using also an output of said light source color detecting means.

13. An apparatus according to claim 10, further comprising flicker detecting means for detecting the flicker of light from a light source.

14. An apparatus according to claim 13, wherein said control means is arranged to control said white balance by using also an output of said flicker detecting means.

15. An apparatus according to claim 1, wherein the second signal corresponding to the quantity of light emitted is a signal corresponding to a flash time of said flash device.

16. An apparatus according to claim 6, wherein said flash light quantity detecting means detects the quantity of light emitted in accordance with a flashing time of said flash device.

17. An apparatus according to claim 10, wherein said flash light quantity detecting means detects the quantity of light emitted in accordance with a flashing time of said flash device.

* * * * *

UNITED STATES PATENT AND TRADEMARK OFFICE
CERTIFICATE OF CORRECTION

PATENT NO. : 4,918,519

DATED : April 17, 1990

INVENTOR(S) : Masao Suzuki and Tadashi Okino

It is certified that error appears in the above-identified patent and that said Letters Patent is hereby corrected as shown below:

Col. 1, line 64, change "produces" to -- produce --

Col. 7, before line 20, insert -- Step 128: the counted number $n$ is increased by --

Col. 7, line 55, change "GNo = $\Sigma y_i$" to -- GNo = $\sum y_i$ --

Col. 12, line 14, change "mean" to -- means --

Signed and Sealed this

Eighth Day of October, 1991

*Attest:*

HARRY F. MANBECK, JR.

*Attesting Officer*       *Commissioner of Patents and Trademarks*